United States Patent
Sauterleute et al.

(10) Patent No.: US 6,729,156 B2
(45) Date of Patent: May 4, 2004

(54) RAM AIR DUCT FOR AN AEROPLANE AIR CONDITIONING SYSTEM

(75) Inventors: Alfred Sauterleute, Heimenkirch (DE); Joachim Haas, Wangen (DE); Norbert Brutscher, Lindenberg (DE); Stefan Hofer, Isny (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 0 days.

(21) Appl. No.: 10/127,376

(22) Filed: Apr. 22, 2002

(65) Prior Publication Data

US 2002/0152765 A1 Oct. 24, 2002

(30) Foreign Application Priority Data

Apr. 20, 2001 (DE) .......................... 101 19 433

(51) Int. Cl.[7] .................................... F25D 9/00
(52) U.S. Cl. ......................................... 62/401
(58) Field of Search ........................... 62/86, 87, 401

(56) References Cited

U.S. PATENT DOCUMENTS

| | | | | |
|---|---|---|---|---|
| 2,767,561 A | * | 10/1956 | Seeger | 62/87 |
| 2,835,340 A | * | 5/1958 | McGuff et al. | 62/86 |
| 3,052,106 A | * | 9/1962 | Sampietro et al. | 62/87 |
| 3,247,901 A | * | 4/1966 | Brandon | 62/86 |
| 3,878,692 A | * | 4/1975 | Steves | 62/87 |
| 4,352,273 A | | 10/1982 | Kinsell et al. | |
| 4,503,683 A | | 3/1985 | Wieland et al. | |
| 5,133,194 A | | 7/1992 | Army et al. | |

FOREIGN PATENT DOCUMENTS

| EP | 1138592 | 10/2001 |
|---|---|---|
| GB | 1565981 | 4/1980 |

* cited by examiner

*Primary Examiner*—Henry Bennett
*Assistant Examiner*—Malik N. Drake
(74) *Attorney, Agent, or Firm*—Dilworth & Barrese LLP

(57) ABSTRACT

The invention relates to a ram air duct for an aeroplane air conditioning system having an inlet channel which can be closed by an inlet valve and in which at least one heat exchanger is arranged, having a blower arranged in a blower chamber and an outlet passage closable by an outlet valve. In accordance with the invention, the outlet passage is divided into two separately extending passages of which one is guided as a blower outlet passage up to the blower into the blower chamber and the other is designed as a bypass passage. The outlet valve only closes the bypass passage in the closed state.

20 Claims, 4 Drawing Sheets

RAM AIR DUCT FOR AN AEROPLANE AIR CONDITIONING SYSTEM

BACKGROUND OF THE INVENTION

The invention relates to a ram air duct for an aeroplane conditioning system having an inlet channel which can be closed by an inlet valve and in which at least one heat exchanger is arranged, having a blower arranged in a blower chamber and an outlet passage closable by an outlet valve.

Such ram air ducts for aeroplane air conditioning systems are already known from the prior art. A schematic section through such a known air conditioning system in accordance with the prior art is shown in FIG. 1. An inlet opening 14 is arranged in the aeroplane skin and can be closed via an inlet valve 16. The inlet valve can be infinitely adjustable in the direction a of the double arrow via an inlet actuator 18. An inlet passage 20 adjoins the opening 14 and air-to-air heat exchangers 22 and 22 are arranged in it. The inlet passage 20 opens into a blower chamber 26 (plenum). An impeller 28 is arranged in the blower chamber 26. The impeller 28 is arranged on a shaft 30 on which a compressor 32 and a turbine 34 of a so-called air-cycle machine of the aeroplane air conditioning system are also seated. The impeller 28 is surrounded by a blower outlet passage 36 which opens into an outlet passage 38. A bypass valve 40, which can be pivoted in the direction b of the double arrow and allows a bypass flow into the outlet passage 38 by being pivoted open correspondingly, is arranged next to the blower outlet passage 36 in the blower chamber 26 (cf. representation in FIG. 1). A so-called jet pump 42 is integrated in the blower outlet passage 36.

The outlet passage can be closed via an outlet valve 44, with the outlet valve 44 being pivotable via an outlet actuator 46 which moves rods in the double arrow direction c.

The inlet valve 16 serves the control of the stagnation air volume flow which is led via the heat exchangers 22 and 24.

In addition to the control of the ram air duct volume flow with the inlet valve, the following three functions must usually be satisfied by the ram air duct. For cooling in flight, a part of the stagnation air must be guided in only one direction through a bypass arranged next to the blower. For heating in ground operation and to produce the circulation flow, a bypass must be made possible to the blower in the opposite direction and overall a joint control of the total volume flow from the blower and the bypass must be ensured.

To satisfy these functions, three apparatuses are necessary in the ram air duct in accordance with the prior art. First, the bypass valve is necessary which is arranged parallel to the ventilator. Dependent on the pressure ratio applied, this valve opens and closes automatically. The blower bypass increases the transmission of the ram air duct and thus the total volume flow in flight.

The jet pump is necessary as the second apparatus. This is arranged, as shown in FIG. 1, parallel to the impeller. Dependent on the conditions, i.e. the speed and the pressure, a volume flow results in the one or the other direction at the jet pump inlet and outlet or practically no volume flow, with the following three functions being satisfied by the jet pump:
1. avoidance of a blower circular flow on the ground during cooling;
2. achievement of a bypass volume flow (in addition to the above bypass valve) in flight during cooling; and
3. making possible a blower circular flow in interaction with a largely closed inlet valve and a reduced ventilator speed during heating operation.

An infinitely movable outlet valve is necessary as a third apparatus which can be moved by means of an electrical drive and rods.

According to the prior art, three apparatuses are therefore necessary to satisfy the initially defined three functions. This results in some disadvantages which have to be accepted.

For instance, the jet pump causes power losses of 5 to 10% in the blower outlet passage. High noise levels arise due to the mixing losses of the jet pump. The heat output is limited by the relatively low jet pump cross-section. The maximally realisable cross-section is limited due to general design criteria of a functioning jet pump, which thus limits the maximum circuit flow (reversed bypass volume flow) and thus also the heat output. In heating operation, the circuit flow is not sufficient to be able to fully close the stagnation air inlet valve and thus to fully suppress the cooling via the heat exchangers. A complete closing of the inlet valve at too low a circulation flow results in pumping of the blower in ground operation, which has to be prevented at all costs.

The reliability of the apparatus is significantly reduced by the bypass valve, which is formed as a swing-type check valve. In addition, the manufacturing costs increase. The valve is exposed to high cyclic strains. The additional module is difficult to integrate and causes additional weight, primarily in that it has to be made of metal.

Whether a volume flow comes about via the bypass valve, depends only on the pressure conditions at the inlet and outlet. A direct control is therefore not possible.

Finally, the outlet valve, which has a long design to close the whole outlet opening, results in flight in high loads both on the valve and on the valve drive. In addition to the high weight of the valve, the required high motor powers also lead to a correspondingly high weight of the drive. A blocking of the outlet valve in the closed position results in the total failure of the system since no throughput is possible any more when the outlet valve fails in the closed position.

SUMMARY OF THE INVENTION

It is the object of the invention to further develop a generic ram air duct for an aeroplane air conditioning system such that the blower circular flow is increased to improve the heat output. At the same time, the reliability of the apparatus should be increased while reducing the cost price.

This object is solved in accordance with the invention by the combination herein. Accordingly, the outlet passage in the generic ram air duct is divided into two separately running passages of which one is guided as the blower outlet passage up to the blower into the blower chamber and the other is designed as a bypass passage, with the outlet valve only closing the bypass passage in the closed state.

The new stagnation air passage makes possible a blower circular flow for the heating operation or a suction from the outlet passage and the surroundings in interaction with a largely closed inlet valve and a reduced blower speed. Three functions are carried out by means of an apparatus already present. The bypass valve required in accordance with the prior art and the jet pump can be omitted. The system operates more reliably and the heat output of the system is improved since no stagnation air has to be guided over the heat exchangers during heating operation. The heat output can thus be controlled via the outlet valve and the blower pump protection can be adapted via a corresponding control. The loads acting on the outlet valve, in particular during flight, are considerably reduced since the outlet valve has a smaller construction overall. The two lines provided here allow higher flexibility in installation and the total weight of the ram air duct can be reduced overall.

Aspects of the invention result from the dependent claims following the main claim.

For instance, the blower outlet passage can have a guide vane grid in its outlet. This grid improves the flowing off and prevents the penetration of unwanted objects into the blower outlet passage.

The impeller can be arranged such that stagnation air flows through it in the direction of the drive (axial throughflow).

It can, however, also be arranged such that it is flowed through counter to the direction of the drive (180° deflection).

A control apparatus can advantageously be present for the separate control of the inlet valve or the outlet valve. In this way, different operating states of the aeroplane air conditioning system can be set. For instance, the inlet valve can be opened in full or in part and the outlet valve can be fully closed for the cooling of the aeroplane on the ground.

The inlet valve can be widely or fully closed and the outlet valve can be wholly or partly open for cooling in flight.

The inlet valve can be widely or fully closed and the outlet valve wholly or partly open for heating in flight. The respective setting of the inlet valve or of the outlet valve takes place by the control apparatus and an electrical or pneumatic drive.

If the outlet valve gets jammed in a closed or almost closed position due to a defect, the inlet valve can be further opened for part compensation by means of the control for cooling in flight.

If the inlet valve is defective and jammed in a relatively widely closed position, the outlet valve can be further opened for part compensation for cooling in flight.

Generally, the outlet passages can be disposed separately next to one another or be designed as separate passages.

The impeller can be arranged such that the conveyed air flows off radially into a manifold.

The blower outlet passage and the bypass passage can be disposed next to one another and be separated by a common partition wall, with the partition wall extending up to the end of the blower outlet passage and of the bypass passage. The partition wall can, however, also be made shorter in comparison with the length of the blower outlet passage and of the bypass passage. In this way, it advantageously results that when heating in flight, when the inlet valve is fully or almost fully closed, a circulation flow sets the blower outlet passage and the bypass passage when the outlet valve is open without this circulation flow being interrupted by the air flowing past the outer skin of the aeroplane.

The outlet valve can also be designed as an open/closed valve without the regulation of intermediate positions.

The blower outlet passage can also additionally be provided with a separate valve.

A jet pump can additionally be integrated in the blower outlet passage for a further heat output increase.

The drive for the impeller can take place only by one motor in accordance with one embodiment, with this motor also being able to be operated as a generator when the impeller is driven by the circulating stagnation air.

Alternatively, at least one turbine—with or without a compressor blade—can serve as the drive for the blower.

BRIEF DESCRIPTION OF THE DRAWINGS

Further details and advantages of the invention result from the embodiments shown in the drawing. There are shown.

DESCRIPTION OF THE PREFERRED EMBODIMENTS

Figure 1:
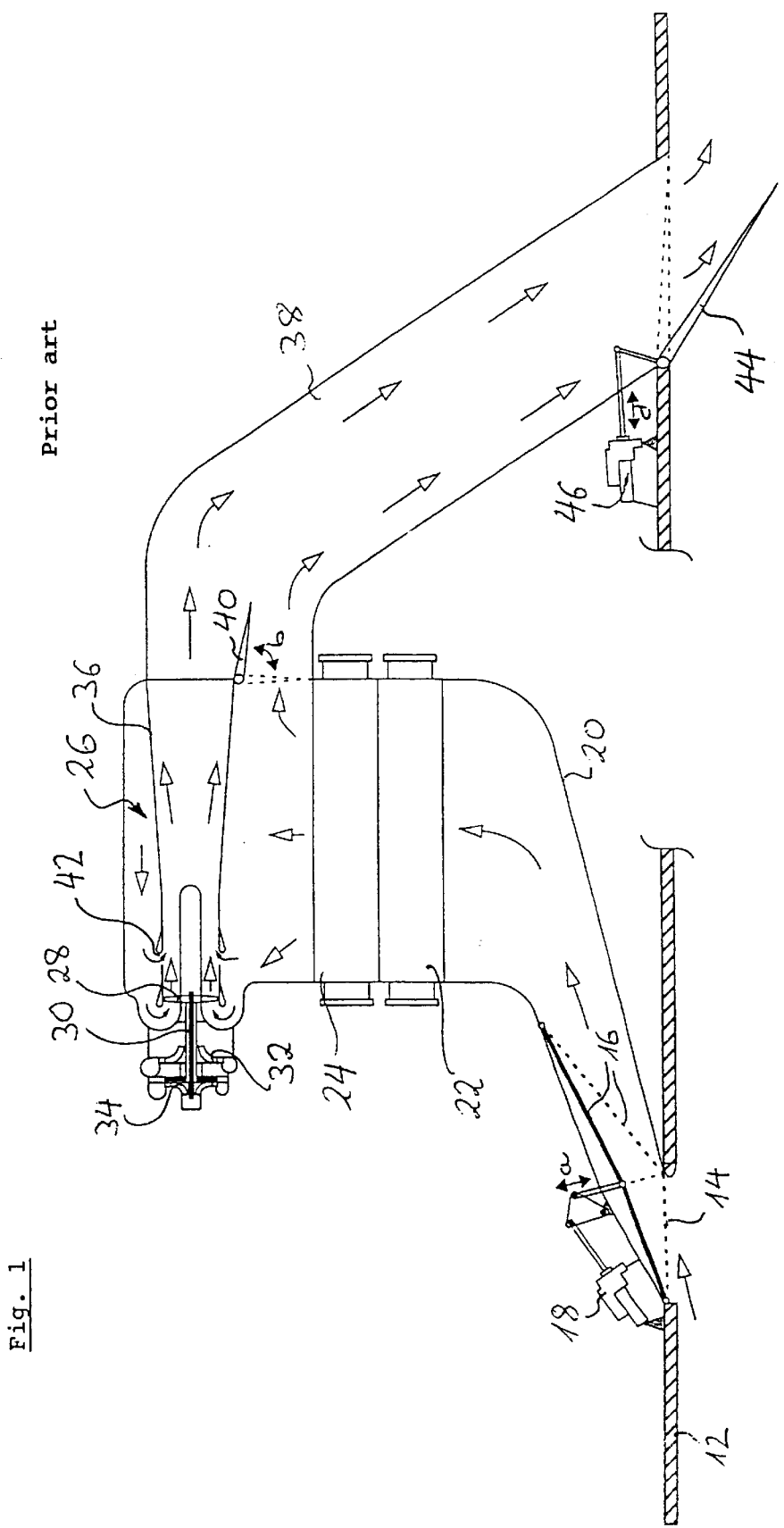
FIG. 1: a schematic sectional representation of a ram air duct for an aeroplane air conditioning system in accordance with the prior art.
Figure 2:
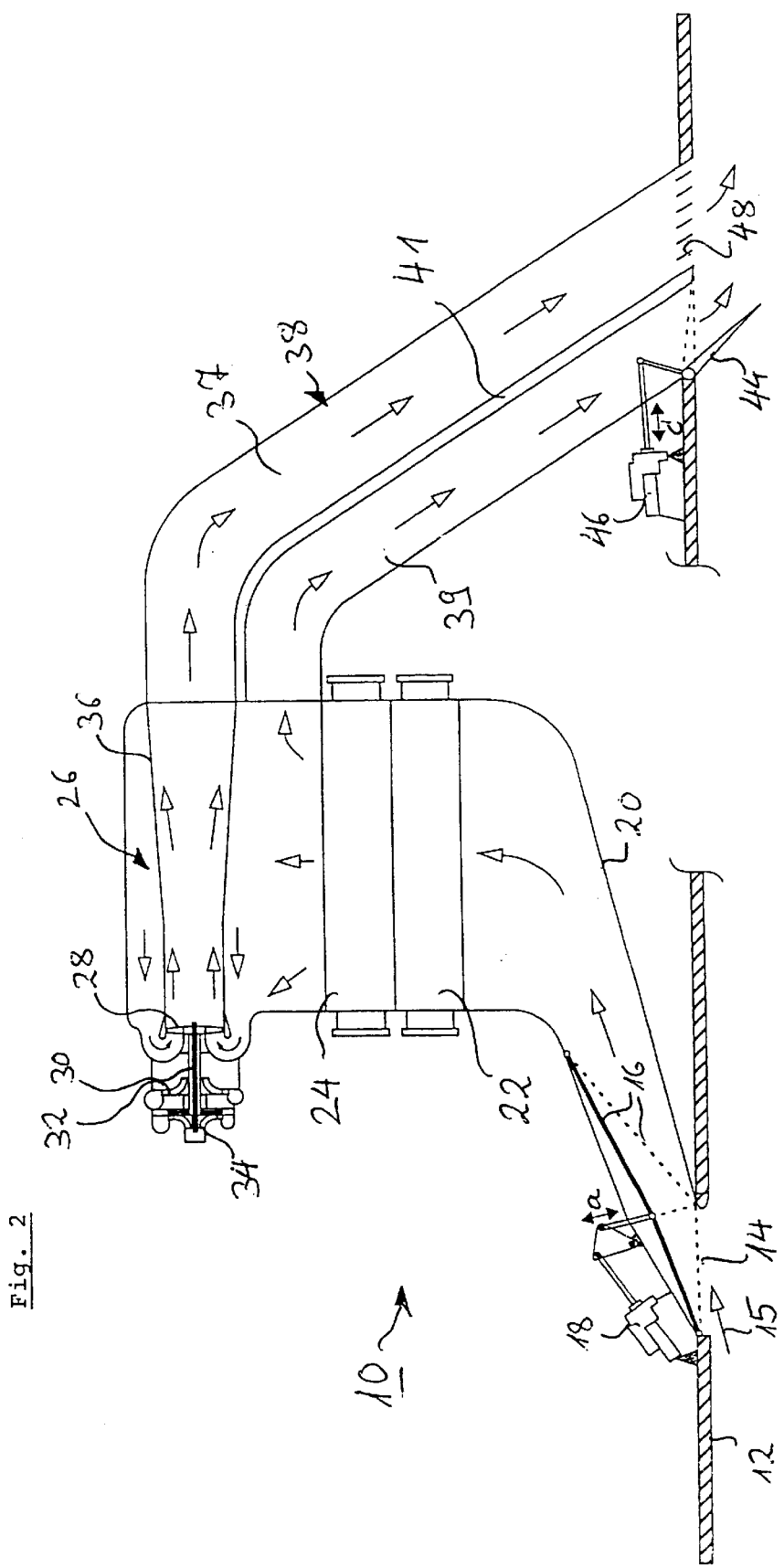
FIG. 2: a schematic sectional representation of a first embodiment of the ram air duct in accordance with the invention.

In the variant of the ram air duct 10 in accordance with FIG. 2, an inlet opening 14 is provided in the outer skin 12 of the aeroplane and can be closed via an inlet valve 16. The inlet valve 16 can be moved in the direction a of the arrow via an electrical drive 18 and rods adjoining it. The stagnation air 15 flowing into an inlet passage 20 on the opening of the valve 16 flows through two air-to-air heat exchangers 22 or 24, which are arranged one after the other in the inlet passage, before it enters into the blower chamber 26. An impeller 28 is arranged in the blower chamber which is seated on a shaft next to a compressor 32 and a turbine 34 and thus forms a so-called air-cycle machine. The impeller 28 is surrounded by a blower outlet passage 36 which continues in the outlet passage 38 as a separate passage 37. The outlet passage 38 is divided into the two passages disposed next to one another, namely the blower outlet passage 37 and a bypass passage 39. The passages 37 and 39 are separated from one another by a partition wall 41. The partition wall 41 continues in the variant in accordance with FIG. 2 up to the end of the passages 37 and 39 arranged parallel next to one another. The bypass passage 39 can be closed via an outlet valve 44 which is pivotable via an actuator 46, with the pivoting taking place by the adjustment of the rods in the direction c of the double arrow. The open end of the blower outlet passage 37 is closed via a guide vane grid 48.

Figure 3:
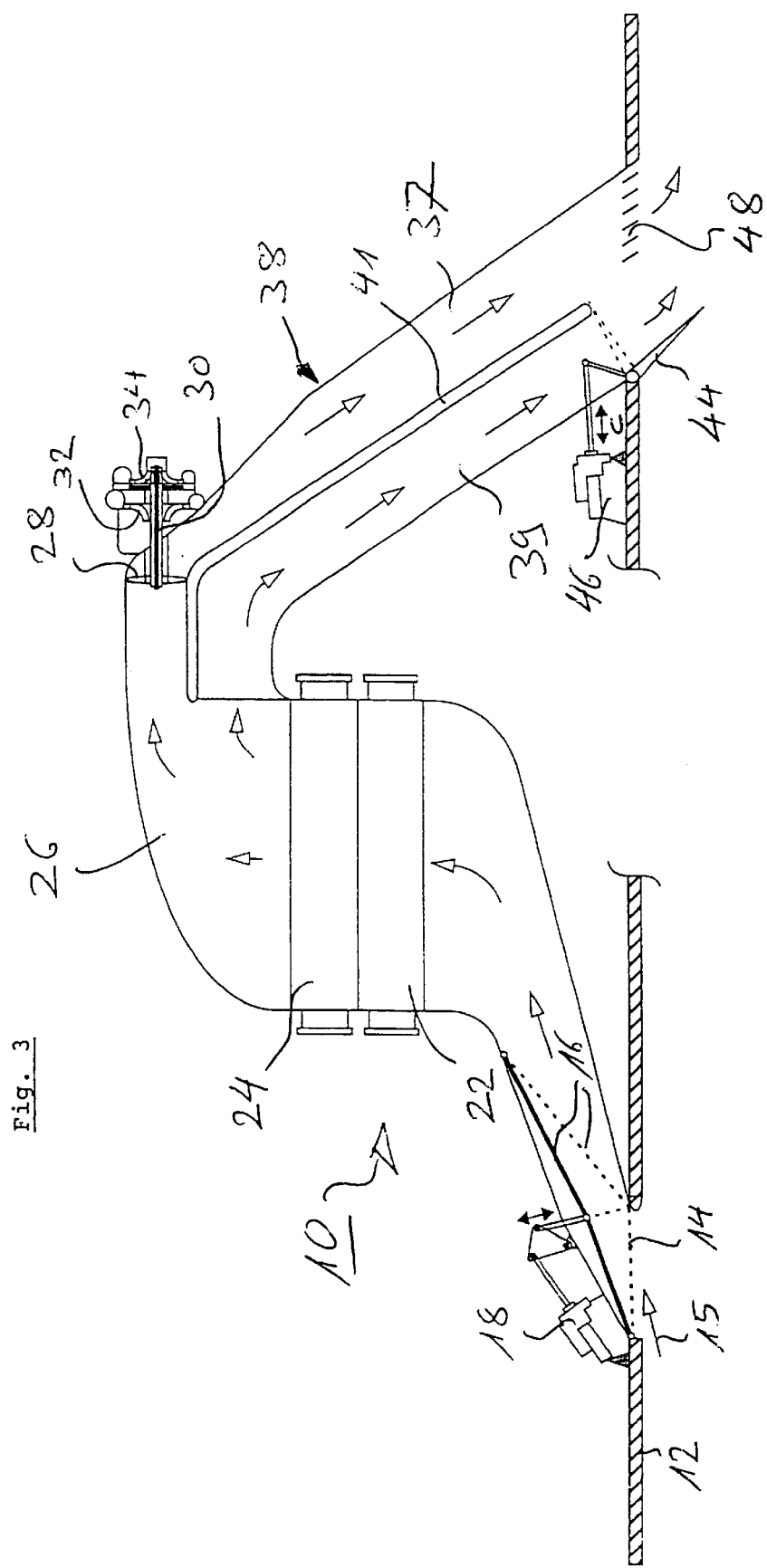
FIG. 3: a schematic sectional representation of a second embodiment of the ram air duct in accordance with the invention.

In FIG. 3, a further embodiment of the stagnation air passage is shown which substantially corresponds to the embodiment in accordance with FIG. 2. However, here the impeller 32 is arranged differently so that here the stagnation air does not have to be deflected through 180° in the blower chamber 26, as is the case in the embodiment in accordance with FIG. 2. The stagnation air is rather sucked in the axial direction of the drive of the impeller 28 and led into the blower outlet passage 37. A further difference in the embodiment in accordance with FIG. 3 consists of the fact that the partition wall 41 is not guided up to the end of the blower outlet passage 37 or of the bypass passage 39, but springs back with respect to the outer skin 12 of the aeroplane. In this way, a circulation flow can be produced in heating operation on the ground or in the air, as is represented in FIG. 4, which results in the air flowing out of the blower outlet passage is again sucked in the bypass passage since the inlet valve 14 is closed.

Figure 4:
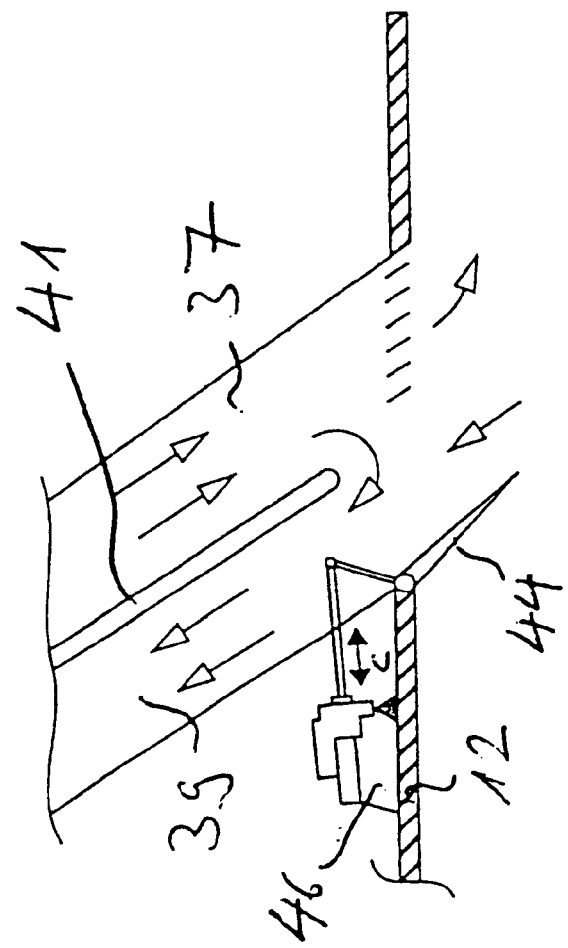
FIG. 4: a detailed representation of the variant in accordance with FIG. 3.

The circulation flow represented with reference to the embodiment in FIG. 4 is also adopted during heating operation on the ground or in the air in the aspect in accordance with FIG. 2. However, here, an additional part suction of air from the environment is expected since the partition wall 41 is drawn out up to the outer skin 12 of the aeroplane.

What is claimed is:

1. A ram air duct for an aeroplane air conditioning system having an inlet channel, an inlet valve structured and arranged to close the inlet channel, and at least one heat exchanger arranged in said duct, said heat exchanger having a blower chamber, a blower arranged in the chamber, an outlet passage, and an outlet valve structured and arranged to close the outlet passage, wherein the outlet passage is divided into two separately extending passages, one of said outlet passages being guided as a blower outlet passage up to the blower and into the blower chamber, and the other of said outlet passages being structured and arranged as a bypass passage to direct flow therethrough bypassing said blower and blower chamber, and the outlet valve is structured and arranged to only close the bypass passage and not the blower outlet passage.

2. A ram air duct in accordance with claim 1, wherein the blower outlet passage has a guide vane grid in its outlet.

3. A ram air duct in accordance with claim 2, wherein the impeller is structured and arranged to direct fluid flow therethrough in a direction of its drive.

4. A ram air duct in accordance with claim 2, wherein the impeller is structured and arranged to direct fluid flow therethrough counter to a direction of its drive.

5. A ram air duct in accordance with claim 2, additionally comprising a control apparatus for the separate controlling of the inlet valve or the outlet valve.

6. A ram air duct in accordance with claim 2, wherein the blower outlet passage and the bypass passage are disposed next to one another and are separated by a common partition wall.

7. A ram air duct in accordance with claim 1, wherein the impeller is structured and arranged to direct fluid flow therethrough in a direction of its drive.

8. A ram air duct in accordance with claim 7, additionally comprising a control apparatus for the separate controlling of the inlet valve or the outlet valve.

9. A ram air duct in accordance with claim 1, wherein the impeller is structured and arranged to direct fluid flow therethrough counter to a direction of its drive.

10. A ram air duct in accordance with claim 1, comprising a control apparatus for the separate controlling of the inlet valve or the outlet valve.

11. A ram air duct in accordance with claim 1, wherein the blower outlet passage and the bypass passage are disposed next to one another and are separated by a common partition wall.

12. A ram air duct in accordance with claim 1, wherein the blower outlet passage and the bypass passage are guided as separate lines.

13. A ram duct in accordance with claim 11, wherein the partition wall extends up to the end of the blower outlet passage and the bypass passage.

14. A ram air duct in accordance with claim 11, wherein the partition wall is shorter than the blower outlet passage and the bypass passage.

15. A ram air duct in accordance with claim 1, additionally comprising a manifold structured and arranged such that air conveyed by the impeller flows radially into the manifold.

16. A ram air duct in accordance with claim 1, wherein the blower outlet passage is structured and arranged to be closed by a separate valve.

17. A ram air duct in accordance with claim 1, wherein a jet pump is additionally integrated in the blower outlet passage.

18. A ram air duct in accordance with claim 1, comprising a motor as a drive for the impeller and structured and arranged to operate as a generator when the impeller is driven by circulating fluid.

19. A ram air duct is accordance with claim 1, additionally comprising at least one turbine to drive the impeller.

20. A ram air duct in accordance with claim 19, additionally comprising a compressor blade in the turbine.

* * * * *